Dec. 26, 1950 A. H. TINNERMAN 2,535,879
SHEET METAL SPRING CLIP WITH CLASP MEANS
Filed April 22, 1947

INVENTOR
ALBERT H. TINNERMAN
BY
H. J. Lombard
ATTORNEY

Patented Dec. 26, 1950

2,535,879

UNITED STATES PATENT OFFICE 2,535,879

SHEET METAL SPRING CLIP WITH CLASP MEANS

Albert H. Tinnerman, Cleveland, Ohio, assignor to Tinnerman Products, Inc., Cleveland, Ohio, a corporation of Ohio Application April 22, 1947, Serial No. 743,161

1 Claim. (Cl. 24—73)

This invention relates in general to improvements in installations for moldings, trim strips and other finishing objects and deals with improved constructions for retaining, mounting and otherwise securing such objects to supporting surfaces, especially those readily accessible from one side only.

More particularly, this invention is directed to an improved securing means comprising substantial attaching clips which may be embodied in an assembly of a molding, trim strip or similar finishing objects such as nameplates, medallions, etc., whereby such articles may be rigidly and securely mounted onto a supporting surface by a simple assembling operation from the accessible side only of such supporting surface.

In the fabrication of sheet metal structures such as cabinets, refrigerator casings, and the like, a difficult problem often is involved in the mounting or securing of a finishing object in desired position on a supporting surface which is not readily accessible from the reverse side, wherefore it becomes necessary to employ an attaching means capable of being applied to rigid, positive fastening position entirely from the accessible side of the installation. To this end, the present invention contemplates, generally, the provision of such an attaching means comprising one or more attaching stems, studs, or the like, on the molding or other finishing object to be mounted, and the use of such attaching means in combination with spring clip fasteners which are secured thereto and provide a snap fastening, clasping engagement with a connecting rib, flange, strip or similar lug element on a supporting part.

The necessary attaching studs on the finishing object to which the spring clips are secured preparatory to the final mounting operation are easily provided for when the finishing object is in the form of a molded hardened plastic part or metal casting inasmuch as the mold form is readily converted to produce the attaching studs as integral elements on the underface of the plastic part or metal casting. Similar attaching studs may be attached to any metal object by spot welding, etc., and in the event that the finishing object is of sheet metal, the attaching studs may assume the form of simple stem elements struck and formed therefrom or otherwise provided by bent lug elements projecting from the underface of the finishing object. The attaching studs thus provided are admirably suited for use in combination with the spring clip fastenings of the invention which are secured thereto and designed to provide the desired interlock between the finishing object and the supporting structure.

A primary object of the invention, therefore, is to provide an improved construction for mounting a molding, trim strip or other finishing object onto a supporting part comprising an attaching stud, stem or the like provided on the finishing object and a clip fastening rigidly secured thereto by substantial clutch means and including one or more spring arms adapted for snap fastening engagement with a connecting strip or lug means on a supporting part to which the finishing object is attached.

A further object of the invention is to provide in such an installation an arrangement whereby the clutch means uniting the clip and attaching stud or stem are arranged in a form of substantial tongues and prongs capable of sliding movement in one direction to assembled relation with the stud to be held in such position against loosening or reverse movement in an opposite direction.

Another object of the invention is to provide a clip constructed from a strip of spring metal to define a base portion provided with substantial clutch means for rigidly and positively engaging the attaching stud on the object to be mounted and with the ends thereof formed in the manner of cooperating spring arms defining guide surfaces which facilitate application of the clip, together with clasping shoulders designed for rigid fastening engagement with a connecting strip or other lug means on a part to which the object is mounted.

A further object of the invention is to provide a spring fastener which includes a spring nut or base portion, or the like, having an improved form of clutch means comprising cooperating biting jaws and prongs which engage the attaching stud uniformly about its periphery in applied fastening position to effect a more secure and satisfactory gripping or holding means. In this regard, the nut portion of the fastener has a wide range and variety of applications and uses as a spring nut of general utility which may be applied to various forms of studs to secure, connect or otherwise fasten two or more parts in an installation.

Further objects and advantages, and other new and useful features in the construction, arrangement and general combination of parts of the invention, will be readily apparent as the following description proceeds with reference to the accompanying drawings, for purposes of illustration but not of limitation, in which like reference characters designate like parts throughout, and in which.

In the mounting of various objects onto supporting parts by concealed fastenings, the attaching arrangement of the present invention is one of general utility and marks a decided advance in the art in that there is required only an inexpensive, one-piece sheet metal attaching clip which dispenses with the use of bolts, screws and nuts and the attendant tedious, time consuming assembling operations which such fastenings require. A further advantage of the improved attaching means resides in the fact that it may be applied directly to a structure from the outer surface thereof by substantial snap fastening action, thereby providing a most important improvement over the usual nut and screw bolt type of fasteners which require access to the rear face of the supporting wall for securing the same.

For purposes of illustration, the invention is shown in connection with an installation for mounting moldings, trim strips, medallions, nameplates, and like finishing objects, but it is to be understood that the improved attaching means is not limited to the type of structure herein illustrated and described since it is obvious the same is equally adaptable to use for securing, mounting or attaching various other objects and articles of manufacture.

Figure 1:
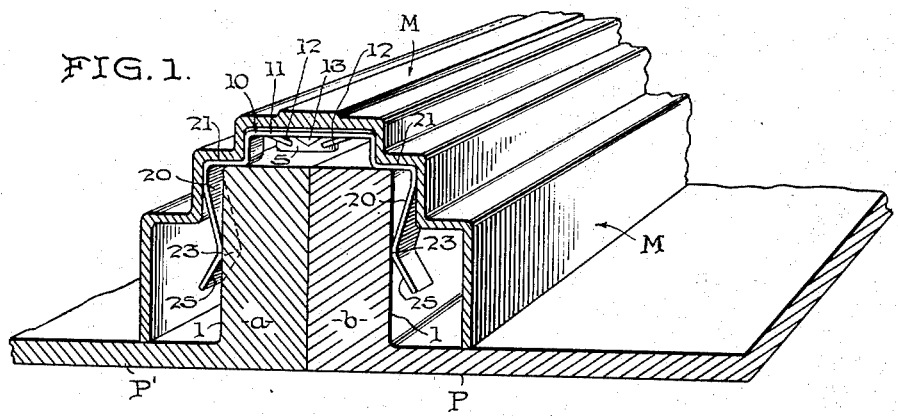
Figure 1 is a perspective view, showing an installation of a molding assembly, or the like, in accordance with the invention, the molding being represented in section with the attaching clip secured thereto and applied to a connecting strip or lug on a supporting structure.

Referring now more particularly to the drawings, Figure 1 shows an installation for mounting a hollow molding M, trim strip or other finishing object onto a supporting part by attaching the same to a connecting strip 1, flange or other connecting lug means on said supporting part. In the present example, the connecting lug means 1 is shown provided by cooperating end flanges a, b, which are secured together to unite the complementary panel members P, P', and which thereby present a connecting rib element, or the like, in a completed installation. Such an installation of a trim molding is particularly advantageous in the securing of relatively thin plastic parts to conceal the joint of said parts while otherwise embellishing the panel assembly thus provided.

It will be appreciated that the connecting lug means 1 formed by the rib elements a, b, may be any equivalent part or element which it is desired to embellish by means of a trim molding, or the like, substantially as shown in Figure 1. As an example, in a fluorescent lamp mounting, the lamp sockets at the outer ends of the fluorescent lamp are usually exposed to view and present a design which is not in harmony with the lamp assembly in general. It is desirable, therefore, to attach a cover plate to the outer body surfaces of such lamp sockets to embellish the same and present a neat and artistic appearance, and, by means of the present invention, such a cover plate or trim object may be easily and quickly attached in a strong and durable fastening assembly which is not subject to loosening or displacement as a result of vibratory motion, shock, or the like.

The molding, trim material or other finishing object M may assume the form of a relatively wide, thin ornamenting member such as shown in Figure 1. The molding is formed with the necessary attaching studs in any suitable manner, as aforesaid, and preferably in the form of integral projections 5 which may be provided on a hardened plastic part or metal casting at little or no added cost in the molding operation. In this relation, a most important advantage is obtained by the present invention in that it is often necessary or desirable for a saving in material that the molding or other finishing object be of comparatively thin cross section and usually of insufficient thickness to receive a metallic insert or threaded screw fastening without being exposed. By the instant construction, the use of threaded fastenings may be avoided and, by employing the improved attaching clips in combination with attaching studs integrally formed on the underface of the hardened plastic part or metal casting, the same may be provided in any selected decorative configuration and of relatively thin cross section, and yet rigidly and securely mounted onto a supporting part by completely concealed fastening means to embellish the supporting surface and create a desirable artistic appearance.

The body of the finishing object M may, of course, assume any selected ornamental or decorative configuration, so long as it is provided with a suitable number of attaching studs 5 projecting from the underface thereof in the manner aforesaid. The finishing object may then be attached to the supporting part by means of one or more spring clips, designated generally 10, comprising a base or nut portion 11 provided with substantial clutch means 12, 13, and spring arms 20 designed for snap fastening, clasping engagement with the connecting strip 1 or other lug means on the supporting part.

Figure 3:
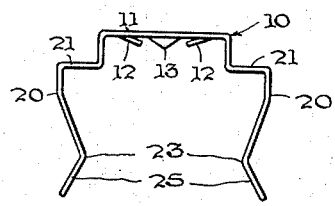
Figure 3 is an edge elevational view of the clip fastener shown in Figures 1 and 2.
Figure 4:
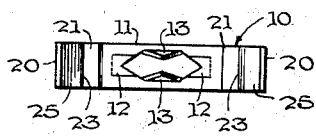
Figure 4 is a bottom plan view of the fastener shown in Figure 3.

As shown in Figures 3 and 4, a preferred form of attaching clip of this character may be economically provided from an inexpensive section of any selected sheet metal strip stock, preferably spring metal or cold rolled metal having spring characteristics. A suitable sheet metal strip or blank stamping of predetermined size is provided at substantially its mid-portion with stud gripping means in the form of spaced, cooperating yieldable tongues 12 and prongs 13 all bent to project slightly to the same side of the base or nut portion 11 to define an opening adapted to receive an attaching stud 5 and permit movement thereof in one direction to a position in which said tongues 12 and prongs 13 are in firm, rigid locked engagement therewith.

Figure 8:
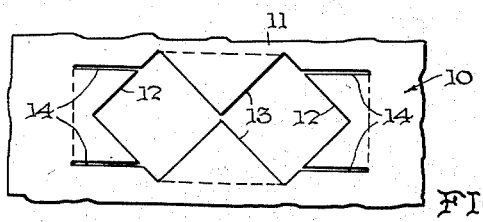

Figure 8 represents the central area of the base or nut portion 11 and illustrates the method of forming such tongues 12 and prongs or pointed anchoring elements 13 by a relatively simple stamping operation. The tongues 12 are defined by spaced parallel slits 14 on either side of a generally V-shaped recess on the free ends of said tongues. Said tongues 12, accordingly, present sharp V-shaped jaws adapted to bite into the axially extending edge surfaces of the stud in applied fastening position. On the bridge portions between the tongues 12, and extending into the space between said tongues, there are provided prongs or pointed anchoring elements 13 which are designed to engage the axially extending side surfaces of the stud. It will be understood that such tongues 12 and prongs 13 may be constructed in any similar or related form or design depending on the size and cross-section of the attaching stud 5.

Figure 5:
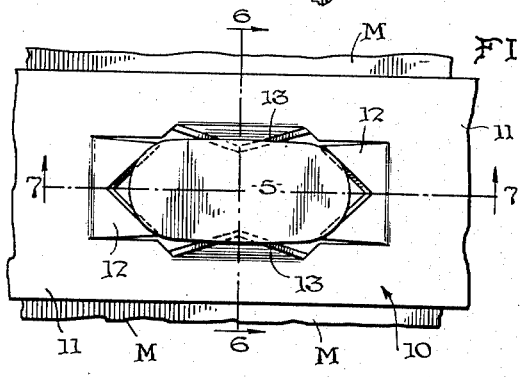
Figure 5 is an enlarged plan view, showing the specific formation of the clutch means for attaching the clip to the molding substantially as shown in Figures 1 and 2, for example.
Figure 6:
Figure 6 is a sectional view of Figure 5 taken on line 6—6 looking in the direction of the arrows.
Figure 7:
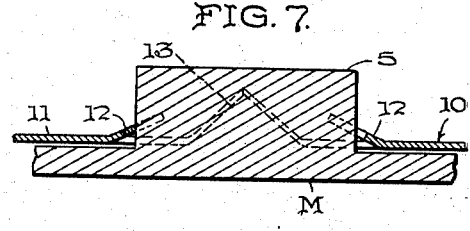
Figure 7 is a sectional view of Figure 5 taken on a line 7—7 looking in the direction of the arrows; and, Figure 8 is an enlarged plan view of a section of the blank from which the fastener is formed showing the initial step in stamping the tongues and prongs which form the clutch means on the base of the fastener, as illustrated in Figures 5, 6 and 7.

In the present example, the stud 5 is shown as one of generally oval or rectangular cross section, and accordingly, the tongues 12 and prongs 13 are of such size and design that the area between the extremities thereof is slightly smaller than the cross-sectional area of said attaching stud 5 when bent slightly to the same side of the base or nut portion 11, as aforesaid. The tongues 12 and prongs 13, in their normal untensioned relation, appear substantially as represented in Figures 3 and 4, and when applied to an attaching stud to secure a clip 10 to the molding M, said tongues and prongs flex outwardly as necessary to pass the stud therebetween to the applied fastening position of the clip illustrated in Figure 2. In such applied fastening position, the V-shaped jaws of the tongues 12 bite into and become embedded in the axially extending edge surfaces of the stud 5 as seen in Figures 5 and 7, while the prongs 13 dig into and become embedded in anchored relation in the side surfaces of the stud as illustrated in Figure 6, such that the clip 10 or other fastener is firmly and rigidly secured to the stud against loosening or reverse movement from applied fastening position thereon.

It is to be understood that the novel form of clutch means just described comprising the cooperating tongues 12 and prongs 13 on the nut or base portion 11 form a spring nut device of general utility which is admirably suited for a wide range and variety of applications and uses for fastening engagement with various forms of attaching or connecting studs, and the like. Said spring nut member, accordingly, is not to be considered as limited in any way to the clip device shown or to the installation disclosed herein.

In the general form of spring clip shown in Figure 3, the spring arms 20 are formed by bent portions on either side of the nut or base portion 11. Said spring arms extend in the same general direction from said base portion and preferably are bent to include one or more flanges or abutments 21 having a configuration conforming generally to the contour of the underside of the molding or other trim object M for firm bearing engagement therewith. The spring arms 20 otherwise are bent inwardly toward each other to provide shoulders 23 and diverging guide surfaces 25 which facilitate application of the spring arms to the connecting strip or other lug means 1 to which the clip is to be secured.

Figure 2:
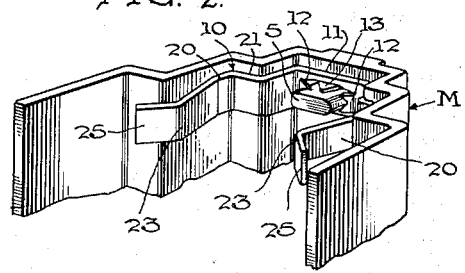
Figure 2 is a perspective view looking from the underside of the molding and showing the clip in attached relation with the molding or other object.

The finishing object, in this instance the molding M, is mounted to the supporting part by means of one or more connecting studs 5 and clips 10, above described, in substantially the following manner. The clip is first secured to its associated attaching stud by inserting such stud in the opening between the tongues 12 and prongs 13, or other clutch means provided in the base or nut portion 11 of the clip. Inasmuch as such tongues and prongs are yieldable, the clip may be advanced along the shank of the stud by relative sliding movement in an axial direction to position the base 11 in substantially flush engagement with the underside of the molding as shown in Figures 1 and 2. In this relation, the extremities of the tongues and prongs engage the shank of the connecting stud under spring tension and thereby become embedded in the material of such stud in firm, gripping engagement therewith to prevent loosening or reverse movement of the clip from assembled relation thereon. The clip is thus maintained in substantially locked assembled relation on the attaching stud to provide the required attaching means for mounting the molding or other finishing object onto the supporting part. In such position, the abutments or flanges 21 are in bearing engagement with the adjacent undersurface of the molding to rigidify the clip in attached relation therewith. It will be understood that the molding or other trim object is provided with attaching studs 5 at regular intervals along its length so that as many of such clips 10 are attached thereto in a similar manner as may be necessary or desirable to mount the molding or other object with the required strength and rigidity.

With the spring clips 10 thus attached to the molding M or other trim object, as shown in Figure 2, the molding is easily and quickly mounted in an installation by applying the projecting spring arms 20 of the clips to clasping relation with the connecting rib 1, strip, flange or other lug means on the supporting part P. The spring arms are initially positioned in straddling relation to the connecting rib or lug and this is facilitated by the outwardly diverging guide surfaces 25 which readily receive the connecting lug or rib therebetween. As pressure is exerted on the molding or other object, said guide surfaces 25 cam against the corner edges of the connecting rib 1 to cause a gradual expansion of the spring arms 20 as necessary for said spring arms to snap into clasping engagement with said connecting rib in applied fastening position substantially as shown in Figure 1. In such position, the shoulders 23 on the spring arms tenaciously grip the connecting rib under continually effective spring tension set up in the expanded spring arms. This serves to maintain the finishing object in close, abutting engagement with the adjacent surface of the supporting part in providing an installation in which the attaching means is under continuously effective spring holding action at all times to insure a firm and rigid mounting that is not subject to loosening or displacement as a result of vibratory motion or shock to which the installation may be subjected in use.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means adapted for a long period of satisfactory service and use.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claim rather than by the foregoing description, with all changes falling within the scope, meaning, and range of equivalency of the claim intended to be embraced therein.

What is claimed is:

A spring clip for securing a trim object over a supporting part, said trim object being provided with an attaching stud projecting from its undersurface having a cross-section of greater length than width defining axially extending side surfaces on said stud merging with axially extending edge surfaces on said stud, said spring clip comprising a sheet metal body bent to provide a base having an elongate opening provided at its opposite ends with marginal portions in the form of cooperating tongues having spaced V-shaped extremities for biting engagement with said axially extending edge surfaces of said stud, and a marginal portion at each side of said elongate opening comprising a prong having its point in the space between said spaced tongue extremities and in position for engaging said axially extending side surfaces of said stud, and a pair of spaced spring arms extending outwardly from said base of the clip in the same general direction, said spring arms including inwardly projecting shoulders adapted to grip said supporting part therebetween in applied fastening position and outwardly diverging guide surfaces adjoining said shoulders having free ends spaced apart greater than the thickness of said supporting part and adapted to spread said spring arms over said supporting part in the application of said shoulders to applied position.

ALBERT H. TINNERMAN.

REFERENCES CITED

The following references are of record in the file of this patent:

UNITED STATES PATENTS

| Number | Name | Date |
|---|---|---|
| 207,019 | Cox | Aug. 13, 1878 |
| 1,225,420 | Eggert | May 8, 1917 |
| 1,778,889 | Disbro | Oct. 21, 1930 |
| 1,840,041 | Kellogg | Jan. 5, 1932 |
| 1,933,857 | Jones | Nov. 7, 1933 |
| 2,015,774 | Weckerly et al. | Oct. 1, 1935 |
| 2,151,221 | Meeker | Mar. 21, 1939 |
| 2,168,721 | Tinnerman | Aug. 8, 1939 |
| 2,169,181 | Kost | Aug. 8, 1939 |
| 2,197,220 | Kost | Apr. 16, 1940 |
| 2,251,723 | Tinnerman | Aug. 5, 1941 |
| 2,275,773 | Kost | Mar. 10, 1942 |
| 2,309,451 | Hasenburger et al. | Jan. 26, 1943 |
| 2,332,852 | Johnson | Oct. 26, 1943 |